(12) United States Patent
Alderman

(10) Patent No.: US 12,358,770 B2
(45) Date of Patent: Jul. 15, 2025

(54) MAN BASKET FOR ATTACHMENT TO TELEHANDLER

(71) Applicant: Darron Alderman, Billings, MT (US)

(72) Inventor: Darron Alderman, Billings, MT (US)

( * ) Notice: Subject to any disclaimer, the term of this patent is extended or adjusted under 35 U.S.C. 154(b) by 590 days.

(21) Appl. No.: 17/856,833

(22) Filed: Jul. 1, 2022

(65) Prior Publication Data

US 2024/0002204 A1    Jan. 4, 2024

(51) Int. Cl.
*B66F 11/04* (2006.01)
*B23D 59/00* (2006.01)
*B66F 9/12* (2006.01)

(52) U.S. Cl.
CPC ............ *B66F 11/04* (2013.01); *B23D 59/007* (2013.01); *B66F 9/127* (2013.01)

(58) Field of Classification Search
CPC ......... B62F 11/04; B62F 9/127; B23D 59/007
USPC .................................................. 182/113, 2.1
See application file for complete search history.

(56) References Cited

U.S. PATENT DOCUMENTS

| | | | | |
|---|---|---|---|---|
| 2,672,377 | A * | 3/1954 | Werner | B66F 9/065 182/115 |
| 3,101,128 | A * | 8/1963 | Dane | B66F 9/127 414/607 |
| 3,889,833 | A | 6/1975 | Thomas | |
| 5,096,018 | A | 3/1992 | Dickinson, Jr. | |
| 5,722,505 | A * | 3/1998 | Grabner | B66F 11/044 182/148 |
| D844,278 | S | 3/2019 | Iotti | |
| 12,252,380 | B1 * | 3/2025 | Crook | B66F 13/00 |
| 2011/0180349 | A1 * | 7/2011 | Beji | B66F 11/04 182/148 |
| 2012/0024629 | A1 * | 2/2012 | Berry, Jr. | A01D 46/20 182/113 |
| 2013/0206508 | A1 * | 8/2013 | Rushlow | E04G 1/18 206/557 |
| 2017/0001846 | A1 | 1/2017 | Paavolainen | |
| 2017/0081161 | A1 | 3/2017 | Iotti | |
| 2017/0217009 | A1 * | 8/2017 | Angold | B25H 1/0021 |
| 2017/0252583 | A1 * | 9/2017 | Goeltz | B66F 11/044 |

(Continued)

FOREIGN PATENT DOCUMENTS

| | | |
|---|---|---|
| CN | 204752132 U | 11/2015 |
| CN | 201832649 0 | 3/2021 |

(Continued)

OTHER PUBLICATIONS

Titan Attachments, 4'×9' 8" Telehandler Work Platform Man Basket, accessed Mar. 30, 2022 at https://www.palletforks.com/fork-mounted/work-platforms/telehandler/4-footx9-foot-8-inch-telehandler-work-platform-man-basket/190504.html.

*Primary Examiner* — Brian E Glessner
(74) *Attorney, Agent, or Firm* — Antoinette M. Tease

(57) ABSTRACT

A man basket having a frame with open front, rear and side walls and a floor that is preferably metal mesh material. The man basket includes two saw platforms extending from the top part of the rear wall and two work surfaces on either side of the saw platforms. The saw platforms optionally include saw stops. A material jig is positioned behind the saw platforms and configured to secure material against the jig when the material is laid across the work surfaces. Two telescoping members extend from the distal ends of the top rail of the rear wall and serve to further support material being worked upon by personnel in the man basket.

24 Claims, 13 Drawing Sheets

(56) References Cited

U.S. PATENT DOCUMENTS

| | | | |
|---|---|---|---|
| 2019/0127194 A1* | 5/2019 | Hansen | E02F 3/96 |
| 2021/0163275 A1 | 6/2021 | Calomino et al. | |
| 2021/0276849 A1* | 9/2021 | Shafer | E04G 5/142 |

FOREIGN PATENT DOCUMENTS

| | | | |
|---|---|---|---|
| DE | 202018102246 U1 * | 8/2018 | |
| DE | 202020101568 U1 | 4/2020 | |
| FR | 2466586 A1 | 4/1981 | |
| GB | 1049233 A | 11/1966 | |
| KR | 20180111720 A | 10/2018 | |
| WO | WO 2021/190866 A1 | 9/2021 | |

* cited by examiner

MAN BASKET FOR ATTACHMENT TO TELEHANDLER

BACKGROUND OF THE INVENTION

1. Field of the Invention

The present invention relates generally to the field of construction equipment, and more particularly, to a man basket that is specifically designed for attachment to a telehandler.

2. Description of the Related Art

Current man baskets are limited in terms of the space they afford for materials and equipment. The ability to carry larger volumes of materials and equipment in the man basket with the operator(s) saves a significant amount of labor time and expense because it eliminates multiple trips up and down in the man basket. Unlike the present invention, conventional man baskets are not configured to hold large volumes of material and the tools necessary to cut those materials on a cutting station that is integral to the man basket.

The inventions discussed below lack the structural features and functional advantages of the present invention. All of these inventions are liftable by forklift tines that undergird the liftable platform, whereas the present invention is configured to fit directly onto the mounting brackets on the distal end of the boom of a telehandler (in lieu of the fork), thereby providing greater versatility and stability.

U.S. Pat. No. 3,889,833 (Thomas, 1975) discloses a personnel safety platform for a forklift in which a pivotable locking means is adapted to cooperate with the abutting plate of a forklift for releasably securing the platform to the forklift and preventing it from sliding off the forks when they are tilted. The platform includes a safety interlock that is connected to the ignition system of the forklift so that personnel in the platform can control the power operation of the forklift. The locking means includes a latch means that is pivotably mounted on a side wall of the platform and rotatable about an axis that extends substantially parallel to the longitudinal axes of the forks.

U.S. Pat. No. 5,096,018 (Dickinson, Jr., 1992) provides a method and apparatus for securing a man basket to the tines of a lifting fork of a forklift. The invention comprises a tine clamp that is mounted to a tine socket on the man basket. The clamp automatically applies a self-adjusting gripping force to the underside of the tine whenever the fork has elevated the man basket and automatically releases the tine when the man basket is resting upright on a surface. The tine clamp comprises a lever that is pivotally mounted to the tine socket, a gripping cam that is rotatably mounted to one end of the lever, and a cam release member that is pivotably mounted to the opposite end of the lever.

U.S. Pat. No. D844278 (Iotta, 2019) displays a lifting device or platform with an open front end. The lifting device appears to be liftable via the fork of a forklift because it comprises two channels on the underside of the device that are configured to receive forklift tines.

U.S. Patent Application Pub. No. 20170001846 (Paavolainen) discloses a telehandler with a chassis section, a boom assembly, and a liftable attachment. The liftable attachment is a lifting fork that fits into fastening elements or channels on the underside of a man basket. The man basket further comprises locking elements for locking the lifting fork securely to the fastening elements and observation elements for electrically monitoring the locking status of the locking elements. The observation element is an electrical or mechanical switch or a hydraulic valve that disallows movements of the man basket if the quick coupling of the basket control unit is engaged, but the locking elements are not in a locking position.

U.S. Patent Application Pub. No. 20170081161 (Iotti) provides a loading platform for telescopic handlers. The loading platform comprises two truss sidewalls and two solid sidewalls, which together form a rectangular compartment. The loading platform also comprises a bottom plane for supporting operators and/or equipment. The sidewalls are removably secured to the bottom plane via interlocking and/or hinge means. The platform is liftable via channels on the underside of the platform that are configured to receive forks of a forklift.

U.S. Patent Application Pub. No. 20210163275 (Calomino et al.) involves a machine for handling heavy components in a heavy equipment environment. The machine comprises a truck with two front wheels and one rear wheel and an outrigger portion that extends forwardly from the truck. A mast extends vertically from a track that extends forwardly from the truck on the base of the outrigger portion. A carriage is mounted on the mast and configured to move vertically on the mast. A pair of forks and a personnel platform are both mounted independently of one another on the carriage and move up and down with the carriage. The forks do not support any of the load in the platform.

BRIEF SUMMARY OF THE INVENTION

The present invention is a man basket comprising: a frame that is configured to form a front wall, a rear wall, and two side walls, wherein each of the front wall, the rear wall, and the two side walls is comprised of a top rail, a center rail, and a bottom rail; first and second saw platforms extending inwardly from a center part of the rear wall proximate to the top rail of the rear wall; a first work surface that abuts up against an outer edge of the first saw platform and a second work surface that abuts up against an outer edge of the second saw platform; a material jig that is comprised of a telescoping arm that is positioned to a rear of the first and second saw platforms along the center part of the top rail of the rear wall and a material stop that is perpendicular to the telescoping arm and configured to secure materials that are laid across the first and second work surfaces; a floor that extends across an entire bottom surface of the man basket and is connected to the bottom rails of the front wall, the rear wall, and the first and second side wall, wherein the floor is undergirded by a plurality of support beams; first and second mounting brackets, each of which extends from the top rail of the rear wall to the bottom rail of the rear wall; a first adapter plate that is connected perpendicularly to the first mounting bracket and a second adapter plate that is connected perpendicularly to the second mounting bracket, each of the first and second adapter plates being configured to couple with a mounting bracket on a telehandler; a first support wall that is connected perpendicularly to an inside surface of the first mounting bracket and a second support wall that is connected perpendicularly to an inside surface of the second mounting bracket, the first and second support walls being spaced apart from and parallel to one another; and first and second telescoping members, the first telescoping member extending telescopically from a first end of the top rail of the rear wall, and the second telescoping member extending telescopically from a second end of the top rail of the rear wall; wherein each of the first and second telescoping members comprises a longitudinal arm that is configured to slide into and out of tubing that is situated behind the first and second saw platforms and a lateral arm that is perpendicular to the longitudinal arm.

In a preferred embodiment, the top rail, the center rail, and the bottom rail of each of the front wall, die mar wall, and the two side walls are configured so that the top rail is higher than and parallel to the center rail, and the center rail is higher than and parallel to the bottom rail. Preferably, the top rail of the front wall, the top rail of the rear wall, and the top rails of die two side walls are connected to each other to form a continuous upper perimeter of the frame. Preferably, the center rail of the front wall, the center rail of the rear wall, and the center rails of the two side walls are connected to each other to form a continuous middle perimeter of the frame. Preferably, the front wall comprises a pivotable door, and, except for an area occupied by the pivotable door, the bottom rail of the front wall, the bottom rail of the rear wall, and the bottom rails of the two side walls are connected to each other to form a continuous lower perimeter of the frame.

In a preferred embodiment, the first and second saw platforms each extends forwardly from one of the two mounting brackets on the rear wall of the frame. Preferably, each of the two side walls has a depth, and each of the first and second work surfaces extends forwardly from the center part of the rear wall for a distance that is less than half the depth of each of the two side walls. Each of the first and second saw platforms preferably comprises a pair of saw stops that are configured to prevent a saw from sliding on the saw platform.

In a preferred embodiment, each of the saw platforms has a first end that is offset downwardly from a center part of the top rail of the rear wall and a second end that terminates at and is supported by a first support rail that extends longitudinally from the first side wall to the second side wall; and the first support rail has a first end and a second end, the first end of the first support rail is situated proximate to and beneath the top rail of the first side wall, and the second end of the first support rail is situated proximate to and beneath the top rail of the second side wall. Preferably, each of the first and second work surfaces is flush with the top rail of the rear wall and configured so that the first and second saw platforms are lower than the first and second work surfaces; and each of the first and second work surfaces is connected to the top rail of the rear wall along a back side of the work surface and connected to the first support rail along a front side of the work surface. The first work surface preferably comprises a backstop that is situated along a back side of the work surface and extends upwardly from the back side of the work surface.

In a preferred embodiment, the present invention further comprises a second support rail that is situated directly underneath the first support rail and extends from the center rail of the first side wall to the center rail of the second side wall; and a first support member that extends downwardly from a first end of the second support rail to the bottom rail of the first side wall and a second support member that extends downwardly from a second end of the second support rail to the bottom rail of the second support wall. The floor is preferably comprised of a metal mesh material. Each of the support beams that undergirds the floor preferably extends from a front of the floor to a back of the floor, and each of the support beams that undergirds the floor is preferably comprised of hollow metal tubing.

In a preferred embodiment, the present invention further comprises two support channels, each of which is situated directly underneath the floor and aligned with the first and second support walls and with the first and second mounting brackets. In another preferred embodiment, the present invention further comprises a support channel that is situated directly beneath the continuous lower perimeter of the frame. In yet another preferred embodiment, each of the first and second adapter plates is a single piece of metal with a straight back, a front belly portion with an opening that is configured to receive a locking pin, and an angled edge that extends upwardly and inwardly from the belly portion to a hook at a top of the adapter plate.

In a preferred embodiment, the first mounting bracket is aligned front-to-back with a center of the first saw platform, and the second mounting bracket is aligned front-to-back with a center of the second saw platform. Preferably, the first work surface extends left-to-right from the outer edge of the first saw platform to a point that is midway between the outer edge of the first saw platform and the first side wall, and the second work surface extends right-to-left from the outer edge of the second saw platform to a point that is midway between the outer edge of the second saw platform and the second side wall. The present invention preferably further comprises a first auxiliary rail that is positioned directly above the first support rail and extends from the outer edge of the first saw platform to the first side wall and a second auxiliary rail that is positioned directly above the first support rail and extends from the outer edge of the second saw platform to the second side wall; wherein the first auxiliary rail is configured to support a front end of the first work surface, and the second auxiliary rail is configured to support a front end of the second work surface. In a preferred embodiment, the support channels are steel U-channels.

In a preferred embodiment, the lateral arm of the first telescoping member extends forwardly from a distal end of the longitudinal arm of the first telescoping member for a distance that is equal to a distance between the top rail of the rear wall and the first auxiliary rail; and the lateral arm of the second telescoping member extends forwardly from a distal end of the longitudinal arm of the second telescoping member for a distance that is equal to a distance between the top rail of the rear wall and the second auxiliary rail.

REFERENCE NUMBERS

Figure 1:
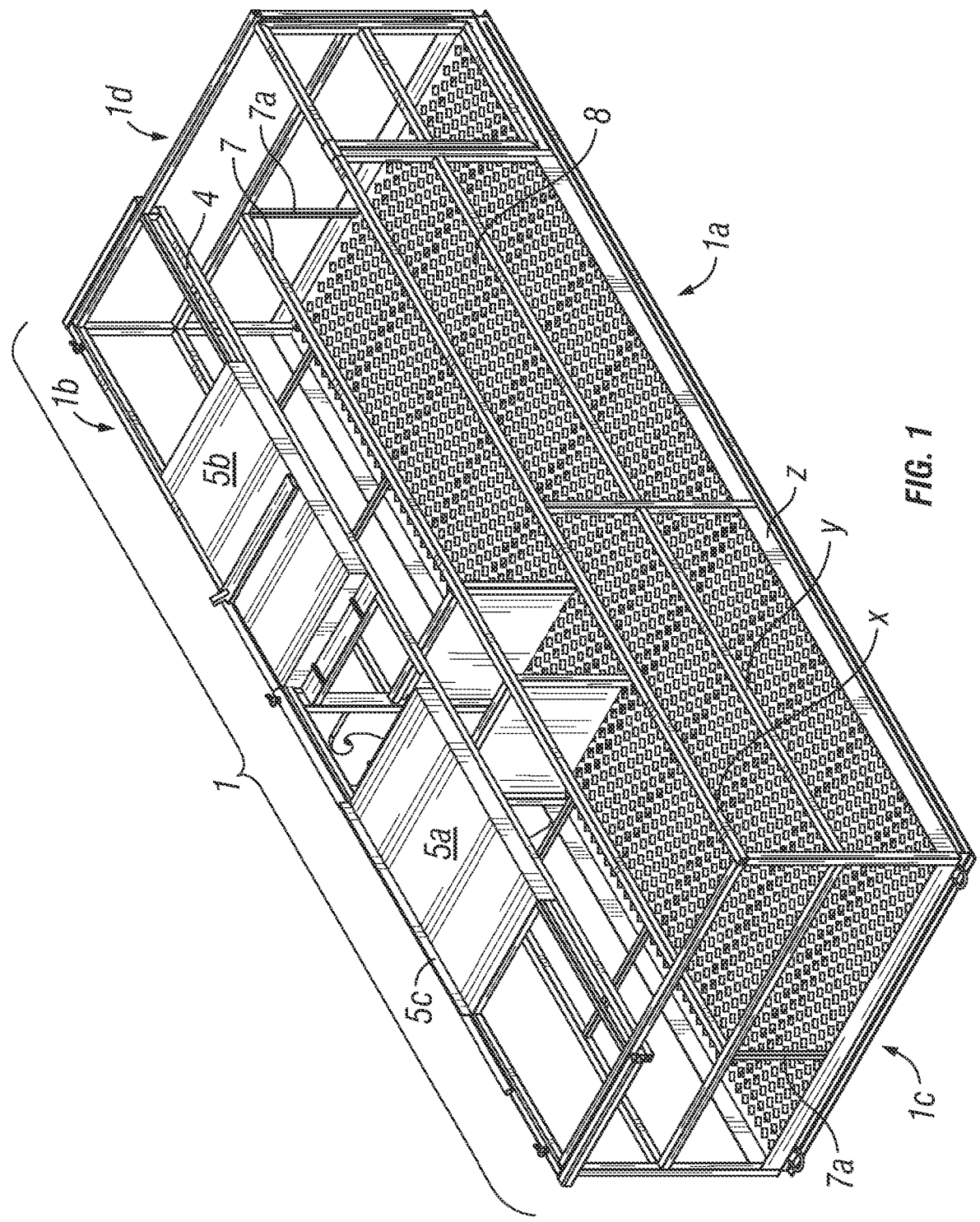
FIG. 1 is a top perspective view of the present invention.

1 Frame
1a Front wall
1b Rear wall
1c First side wall
1d Second side wall
2 Pivotable door
3a First saw platform
3b Second saw platform
3c Saw stop
4 First support rail
5a First work surface
5b Second work surface
5c Backstop
6 Material jig
6a Telescoping arm (or jig)
6b Material stop
6c Round tubing
7 Second support rail
7a Support member
8 Floor
9 Support beam
9a Support beam (center-most)
10 Support channel (central)
11 Adapter plate
11a Front belly portion (of adapter plate)
11b Opening (in adapter plate)
11c Angled edge (of adapter plate)
11d Hook (of adapter plate)
11e Top end (of adapter plate)
12 Support wall
13 Support channel (perimeter)
14 Mounting bracket
14a Bottom end (of mounting bracket)
14b Flat rear edge (of mounting bracket)
15 Lifting eye
16 Auxiliary rail
17 Connecting bracket
18 Telescoping member
18a Longitudinal member
18b Square tubing
18c Lateral arm
19 Threaded pin

DETAILED DESCRIPTION OF INVENTION

FIG. 1 is a top perspective view of the present invention. As shown in this figure, the present invention comprises a frame 1 that is configured to form a front wall 1a, a rear wall 1b, and two side walls 1c, 1d. The front wall, rear wall and side walls are all preferably open, as shown. Each of the front wall, the rear wall, and the two side walls is comprised of a top rail x, a center rail y, and a bottom rail z, all of which are oriented so that the rails are parallel to each other on each wall. (in the embodiment shown in these figures, the top and center rails are in the form of square tubing, and the bottom rail is in the form of a flat plate; however, the present invention is not limited to any particular size or shape of rail.) The top rails x on the front, rear and side walls are connected to each other to form a continuous upper perimeter of the frame 1. The center rails y on the front, rear and side walls are connected to each other to form a continuous middle perimeter of the frame 1. With the exception of the area directly underneath the pivotable door 2 (see FIG. 11), the bottom rails z on the front, rear and side walls are connected to each other to form a continuous lower perimeter of the frame 1. The front wall 1a comprises a pivotable door 2, which is shown in greater detail in FIG. 11.

Extending forwardly (that is, toward the center of the man basket) from a center part of the rear wall 1b proximate to the top rail x are two platforms 3a, 3b (see also FIG. 7) that are configured to support a chop saw (not shown). The platforms 3a, 3b are spaced apart from each other, parallel to each other, and perpendicular to the rear wall. The platforms preferably extend forwardly from the center part of the rear wall for a distance that is less than half the depth of the side walls 1c, 1d (that is, less than half the length of the top rail x of each side wall). Each of the platforms 3a, 3b preferably comprises a pair of saw stops 3c, which are positioned to prevent the saw from sliding on the platforms.

Each of the saw platforms 3a, 3b has a first end that is offset downwardly from the center part of the top rail x 1b of the rear wall and a second end that terminates at and is supported by a first support rail 4 that extends longitudinally (that is, along the long axis of the rectangular frame) from the first side wall 1c to the second side wall 1d. Each end of the first support rail 4 is situated proximate to and beneath (lower than) the top rail x of the side walls 1c, 1d (that is, the first support rail 4 is offset downwardly from the top rails x). Two work surfaces 5a, 5b are situated on either side of the saw platforms 3a, 3b (that is, to the outside of each of the platforms). Each work surface 5a, 5b is rectangular in shape and has an inner side that abuts up against the outer edge of the saw platform 3a, 3b. The work surfaces are preferably flush with the top rail x of the rear wall 1b so that the saw platforms 3a, 3b are slightly lower than the work surfaces 5a, 5b. Each of the work surfaces 5a, 5b is connected to the top rail x of the rear wall 1b along the back side of the work surface and connected to the first support rail 4 along the front side of the work surface. In a preferred embodiment, the work surfaces do not extend clear to the top rails x of the side walls 1c, 1d but rather terminate at a point that is approximately mid-way between the inner side of the work surface and the top rail x of the side wall 1c, 1d.

In a preferred embodiment, the first work surface 5a comprises a backstop 5c that is situated along the back side of the work surface. The backstop 5c extends upwardly from the back side of the work surface 5a to prevent materials from sliding off of the work surface. The invention further comprises a material jig 6 (see also FIG. 9), which comprises a telescoping arm 6a that is positioned to the rear of the saw platforms 3a, 3b along the center part of the top rail x of the rear wall 1b. The material jig 6 further comprises a material stop 6b (in the embodiment shown, it is the form of a paddle), which is perpendicular to the telescoping arm 6a and configured to secure materials that are laid across the work surfaces 5a, 5b and being worked on by the saw (see FIG. 10).

The present invention further comprises a second support rail 7, which is situated directly underneath the first support rail 4 and extends from the center rail y of the first side wall 1c to the center rail y of the second side wall 1d. Two support members 7a extend downwardly from each end of the second support rail 7 to the bottom rail z of each side wall 1c, 1d. The present invention further comprises a floor 8 that extends across the entire bottom surface of the man basket and is connected to the bottom rails z of the front wall 1a, rear wall 1b and side walls 1c, 1d. The floor is preferably comprised of a metal mesh material.

Figure 2:
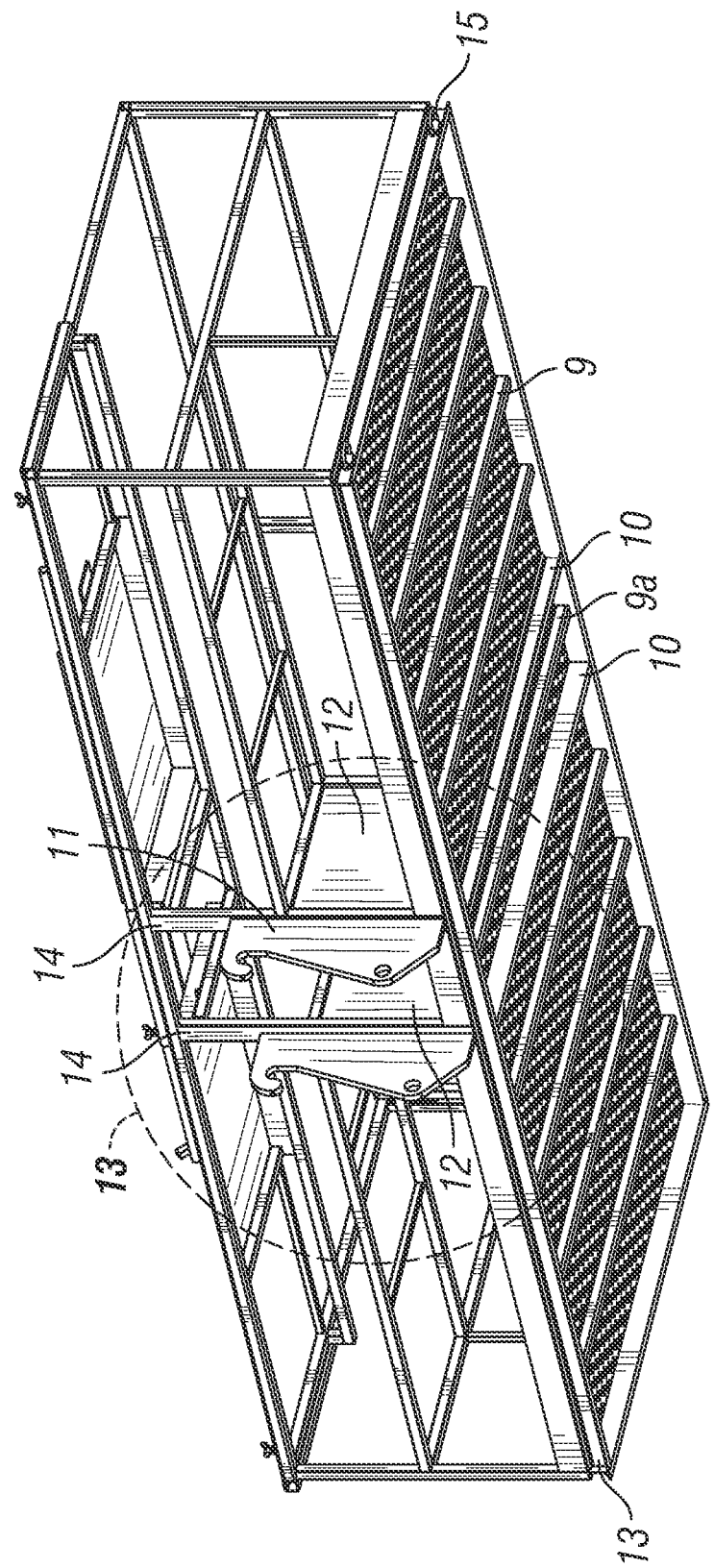
FIG. 2 is a bottom perspective view of the present invention.

FIG. 2 is a bottom perspective view of the present invention. As shown in this figure, the floor 8 is preferably undergirded with a plurality of support beams 9 that are parallel to each other and that extend laterally from the front of the floor to the back of the floor. The support beams 9 are configured to provide support to the floor 8 so that it can safely hold personnel and equipment; however, the weight of the man basket is preferably optimized to provide the greater strength and stability for the least weight. For this reason, the support beams 9 are preferably comprised of hollow metal (steel) tubing. Two support channels 10 are also situated directly underneath the floor 8, parallel to the support beams 9, and extend laterally from the front of the floor to the back of the floor. In a preferred embodiment, one support beam 9 is situated between the two support channels 10.

The support channels 10 are situated in line with two adapter plates 11, the structure and function of which is explained below. The support channels 10 are also in line with two support walls 12, which are located on top of the floor 8 directly underneath but spaced apart (vertically) from the saw platforms 3a, 3b. The support channels 10 are configured to provide structural support to the central lateral axis of the man basket. The support channels 10 are equidistant from the central lateral axis of the man basket, which is represented by the one support beam 9 that is positioned between the two support channels 10. A support channel 13 preferably extends around the entire perimeter of the floor 8, directly underneath the bottom rails z, to provide additional structural support to the man basket.

Figure 3:
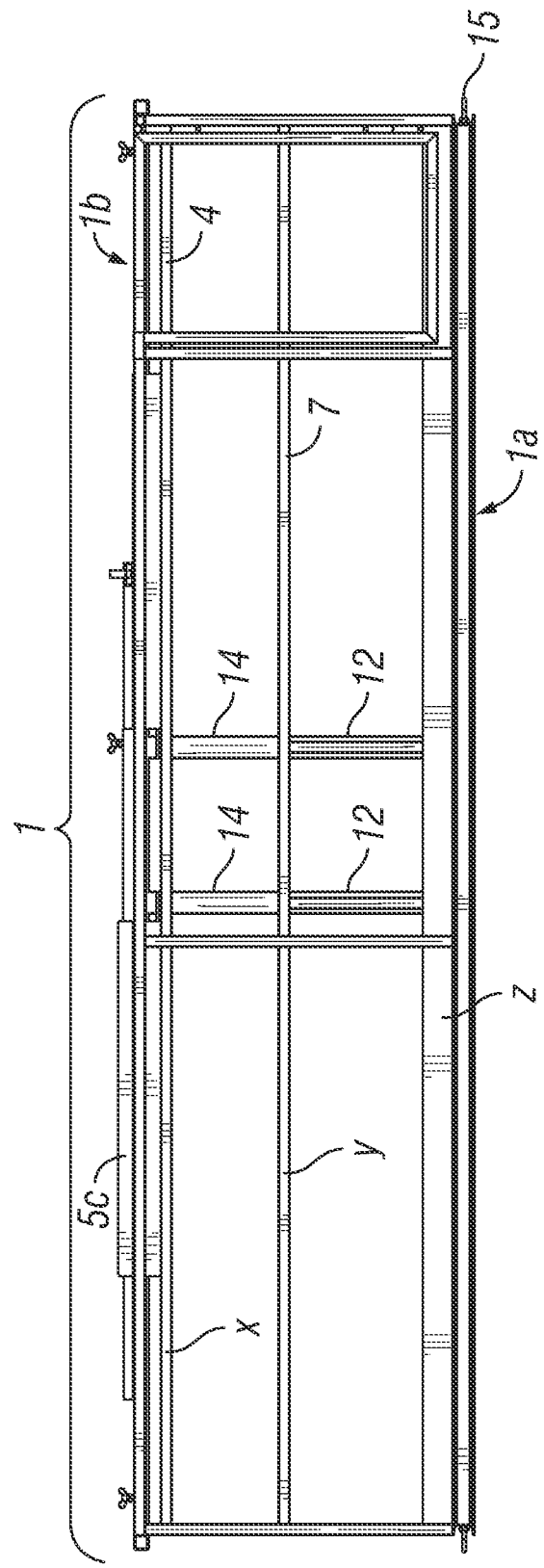
FIG. 3 is a front view of the present invention.

FIG. 3 is a front view of the present invention. This figure clearly shows the first and second support rails 4, 7 in relation to the top, center and bottom rails x, y, z of the front, rear and side walls 1a, 1b, 1c, 1d. It also shows the support walls 12 and the mounting brackets 14 for the adapter plates 11.

Figure 4:
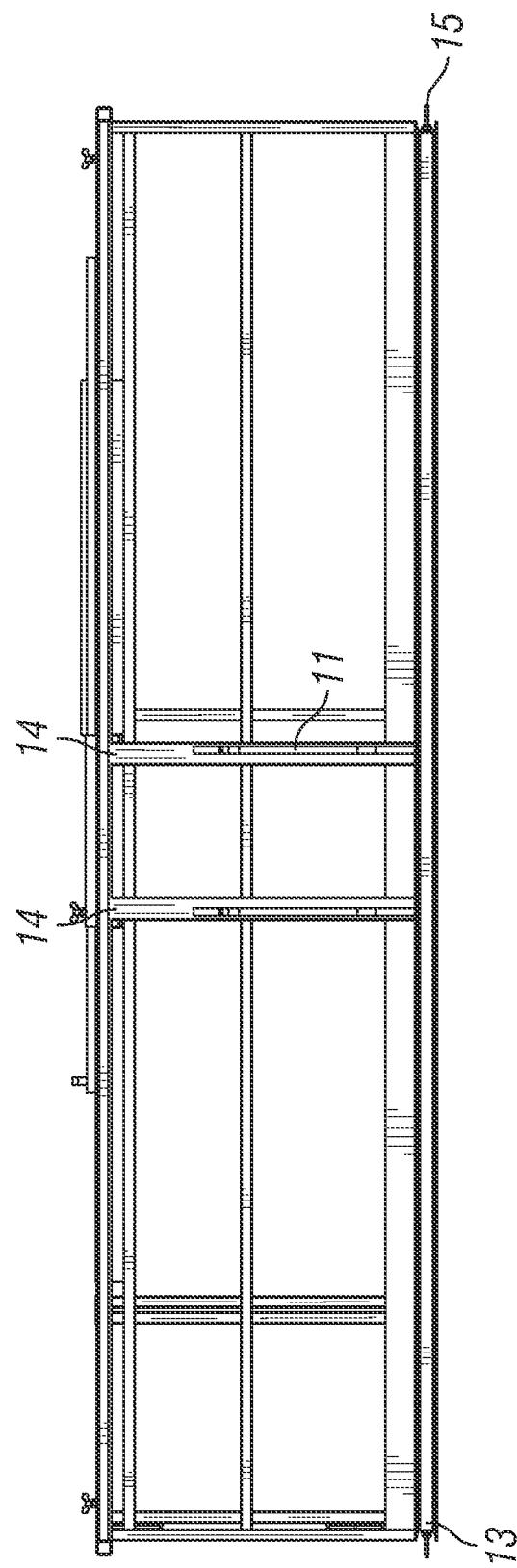
FIG. 4 is a rear view of the present invention.

FIG. 4 is a rear view of the present invention. As shown in this figure, the adapter plates 11 extend rearwardly from mounting brackets 14 that extend vertically from the bottom rail z of the rear wall 1b to the top rail x of the rear wall. The mounting brackets 14 are aligned with the support channels 10 discussed above so that the support channels 10 provide added structural support when the man basket is lifted by a telehandler via the adapter plates 11 (see also FIG. 8).

Figure 5:
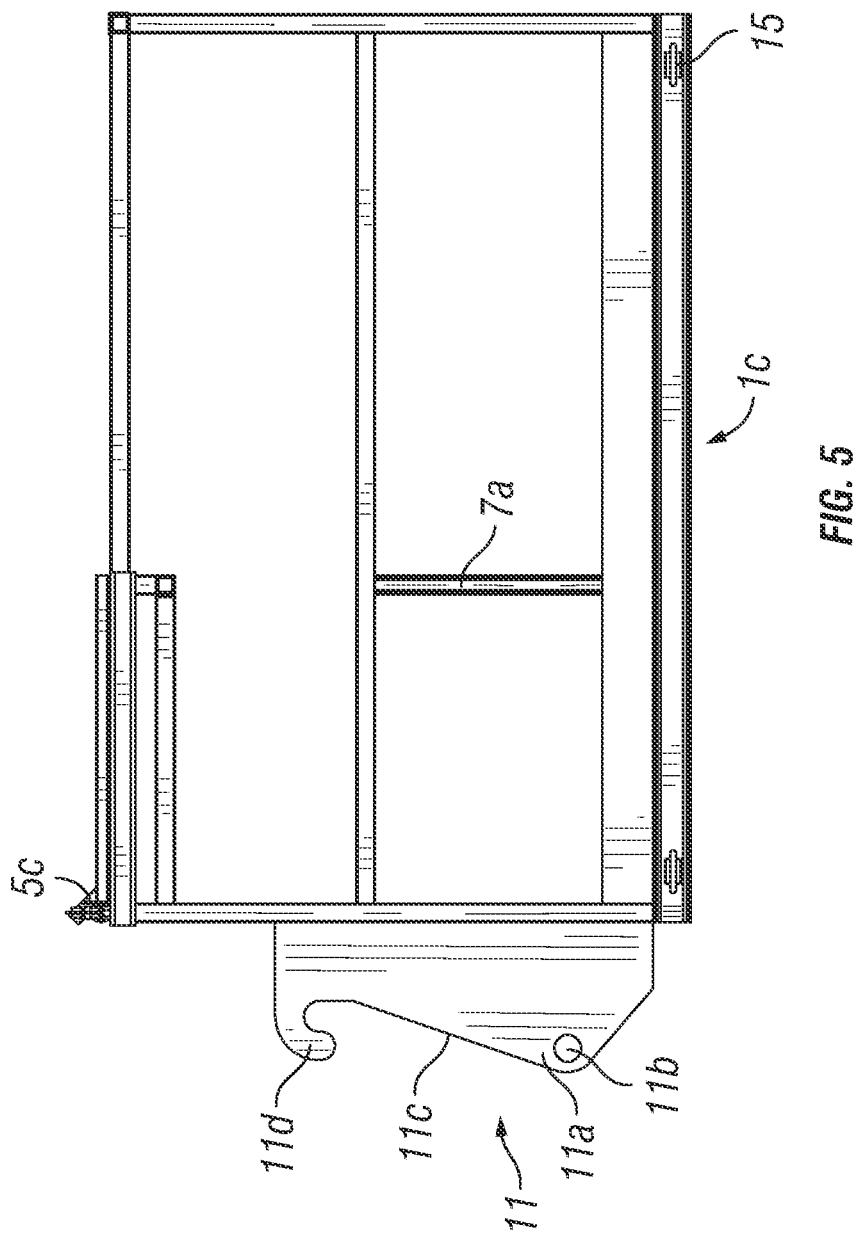
FIG. 5 is first side view of the present invention.
Figure 6:
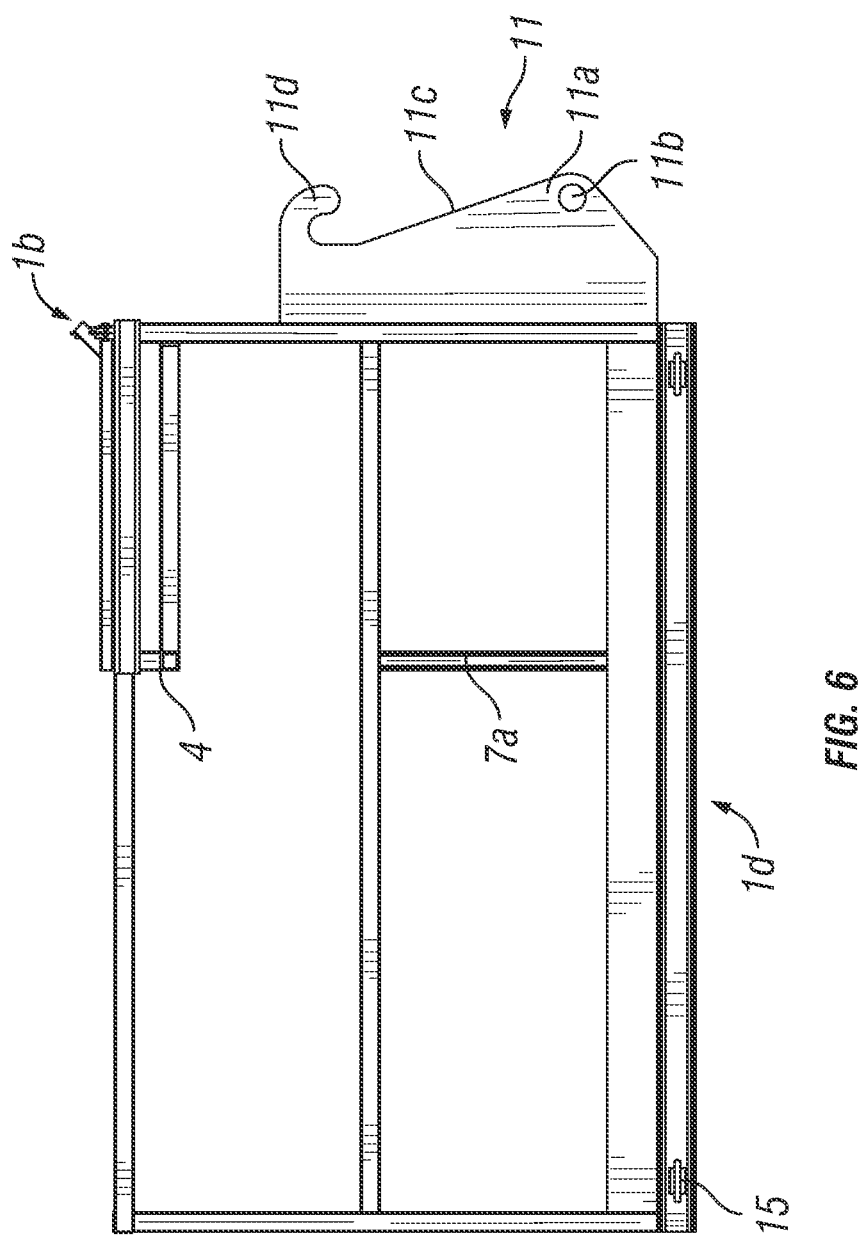
FIG. 6 is a second side view of the present invention.

FIG. 5 is first side view of the present invention, and FIG. 6 is a second side view of the present invention. As shown in these figures (and in FIG. 2), a lifting eye 15 is preferably provided at each corner of the man basket on the bottom rail z of the two side walls 1c, 1d. These two figures illustrate most clearly the shape of the adapter plates 11. Each adapter plate is preferably a single piece of metal with a straight back (for attachment to the mounting plate 14), a front belly portion 11a with an opening 11b for insertion of a locking pin (not shown), and an angled edge 11c that extends upwardly and inwardly from the belly portion 11a to a hook 11d at the top of the adapter plate 11. This specific configuration is specially adapted for attachment to any CATERPILLAR™ telehandler built after 2004. It is important to note that the present invention does not include any receivers for a forklift fork; the present invention is not designed to be lifted by a fork but rather to attach directly to the mounting brackets on a telehandler (the same mounting brackets that would be used to attach the fork to the telehandler). In this manner, the present invention replaces the fork, and is lifted directly by the boom on the telehandler.

Figure 7:
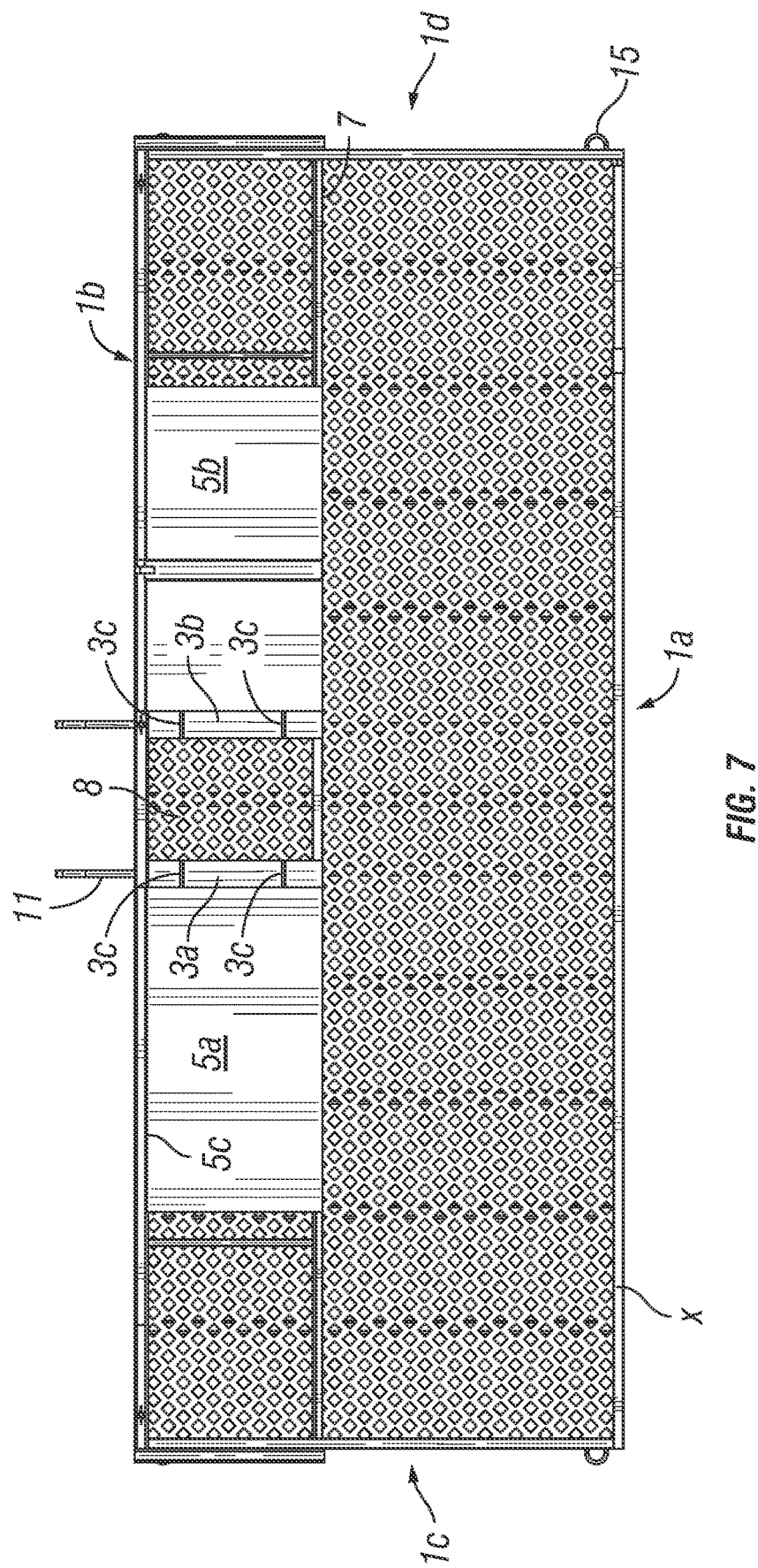
FIG. 7 is a top view of the present invention.

FIG. 7 is a top view of the present invention. As shown in this figure, each of the mounting brackets 14 is aligned laterally (that is, front to back) with the center of one of the two saw platforms 3a, 3b. This figure also clearly shows the work surfaces 5a, 5b in relation to the floor 8. As noted above, each work surface preferably extends longitudinally (that is, right to left or left to right) from the outer edge of the saw platform 3a, 3b to a point that is midway (but not necessarily at the exact center) between the outer edge of the saw platform and the side wall 1c, 1d and laterally (that is, from front to back) from the first support rail 4 to the rear wall 1b.

Figure 8:
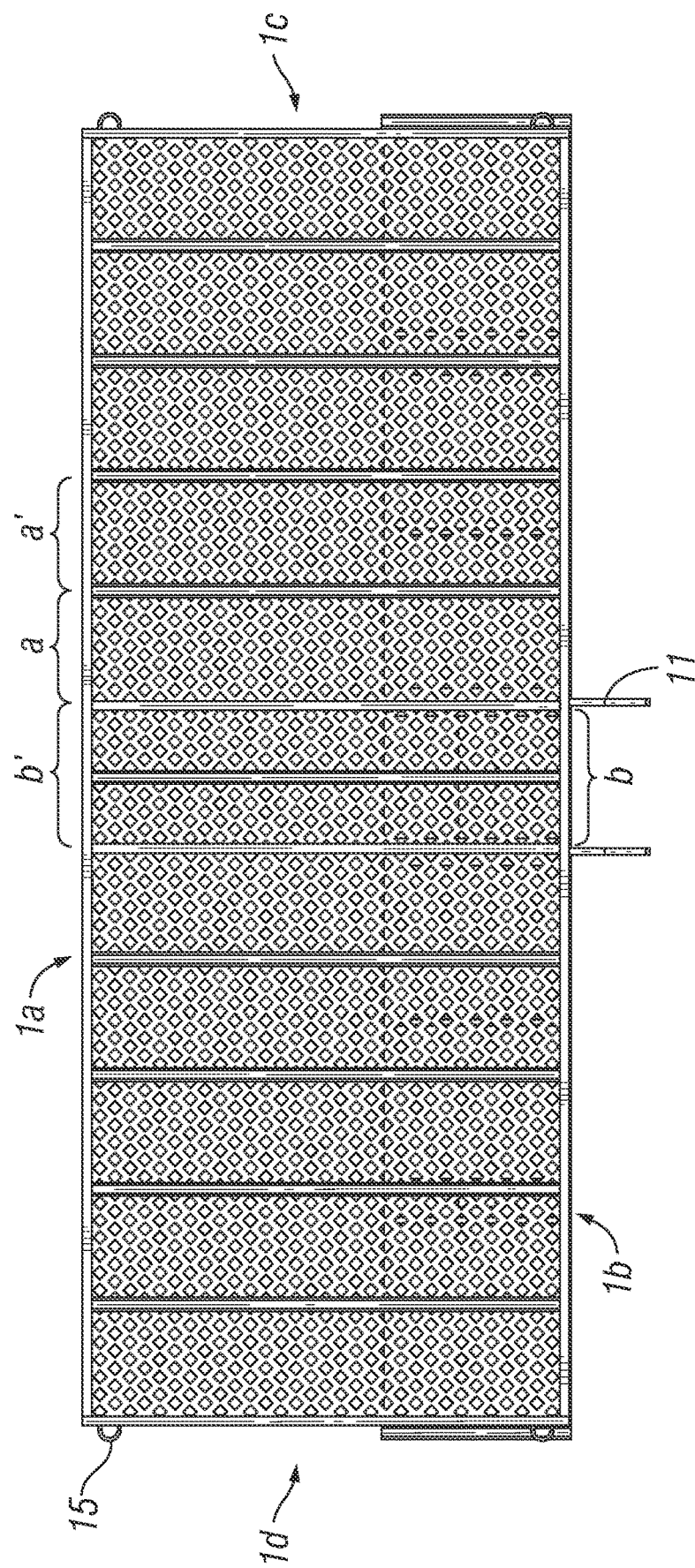
FIG. 8 is a bottom view of the present invention.

FIG. 8 is a bottom view of the present invention. As shown in this figure, the space (longitudinally, or left to right) between each of the support beams 9 is preferably equal except for the center-most support beam 9a, which is situated between the two support channels 10. The distance between each support channel 10 and the adjacent support beam 9 to the outside of the support channel 10 (designated as "a" in FIG. 8) is approximately the same as the distance between each of the other adjacent support beams 9 (designated as a' in FIG. 8). The distance between the two mounting brackets 14 (designated as "b" in FIG. 8) is approximately the same as the distance between the two support channels 10 (designated as b' in FIG. 8).

Figure 9:
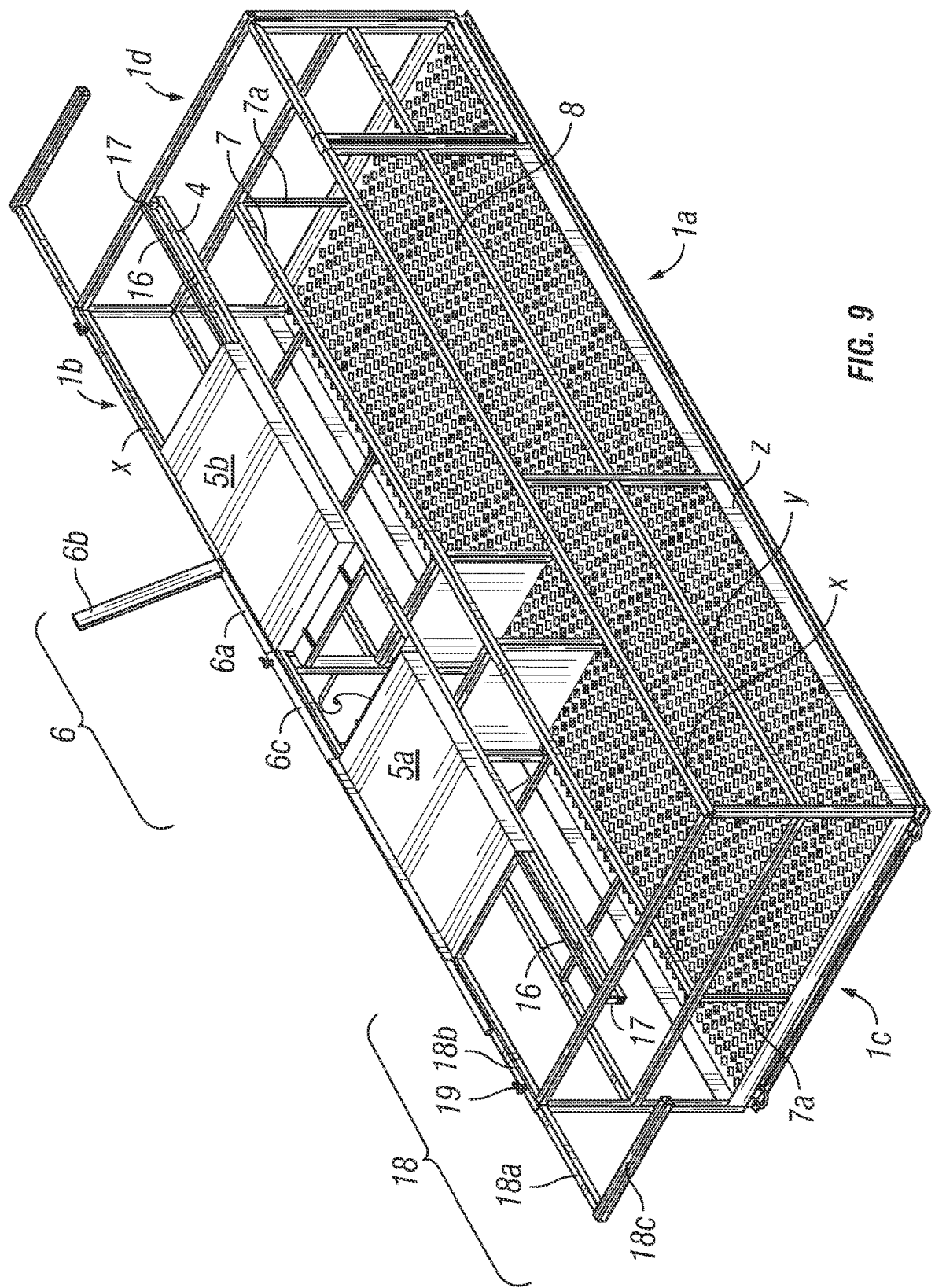
FIG. 9 is a top perspective view of the present invention shown with the telescoping members in an extended position and the material jig in an open (or upwardly rotated) position.

FIG. 9 is a top perspective view of the present invention shown with the telescoping members in an extended position and the material jig in an open (or upwardly rotated) position. Note that the first support rail 4 is on a lower horizontal plane than the top rail x of the rear wall 1b. First and second auxiliary rails 16 are positioned directly above the first support rail 4 on either side of the saw platforms 3a, 3b, and each auxiliary rail 16 extends from the outer edge of one of the two saw platforms to the side wall 1c, 1d. The front end of each work surface 5a, 5b is supported by the auxiliary rail 16 (that is, the auxiliary rail runs directly underneath the top front edge of the work surface) and extends downwardly and terminates at the first support rail 4. Connecting brackets 17 connect the distal (outer) end of each of the auxiliary rails 16 to one of the two distal ends of the first support rail 4 at either end of the frame directly underneath the top rail x of the side wall.

Also shown in FIG. 9, the present invention comprises two telescoping members 18, each of which extends telescopically from an outer end of the top rail x of the rear wall 1b. Each telescoping member 18 comprises a longitudinal arm 18a that is configured to slide into and out of square tubing 18b that overlies the top rail x of the rear wall 1b and a lateral arm 18c that is perpendicular to the longitudinal arm 18a and that extends forwardly the same distance as the distance between the top rail x of the rear wall 1b and the auxiliary rail 16 (see also FIG. 7). Each telescoping member 18 is secured in place by a threaded pin 19.

Figure 13:
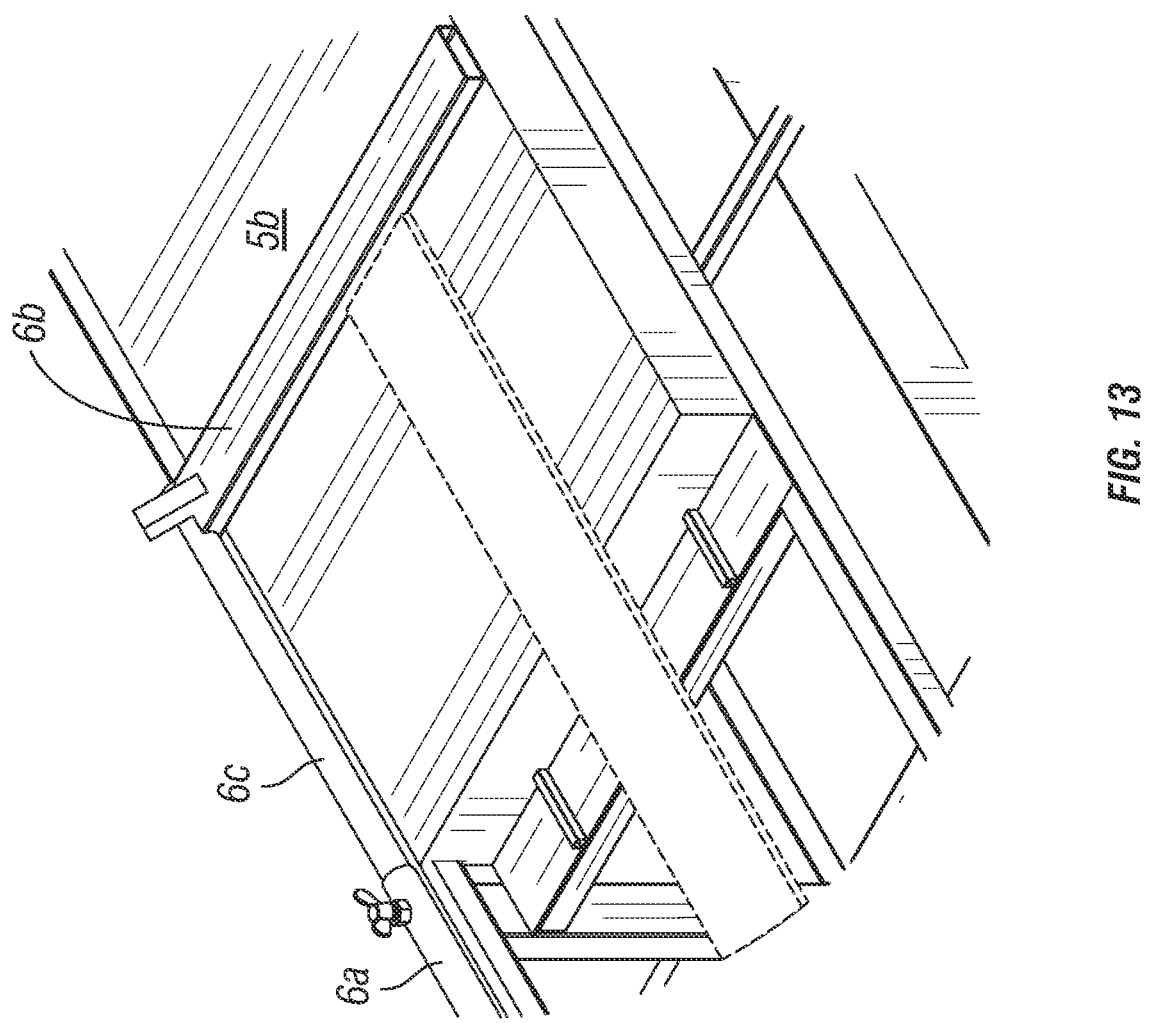
FIG. 13 is a detail view of the material jig of the present invention.

In this figure, the material jig 6 has been rotated into an open (or raised) position. As noted above, the material jig 6 comprises a telescoping arm 6a and a material stop 6b that is perpendicular to the telescoping arm 6a and configured to lie flat on the work surface 5a when the material jig is in a closed (or lowered) position. The telescoping arm 6a of the material jig 6 is configured to slide into and out of round tubing 6c that is situated on top of the top rail x of the rear wall b and that extends between the inner edges of the two work surfaces 5a, 5b above the rear ends of the saw platforms 3a, 3b, thereby adjusting the distance between the material jig 6 and the saw platform 3a that is proximate to the work surface 5a on which the material jig lies when it is in a closed position. The telescoping arm 6a of the material jig 6 is secured in place within the round tubing 6c by a threaded pin 19 (see also FIG. 13).

Figure 10:
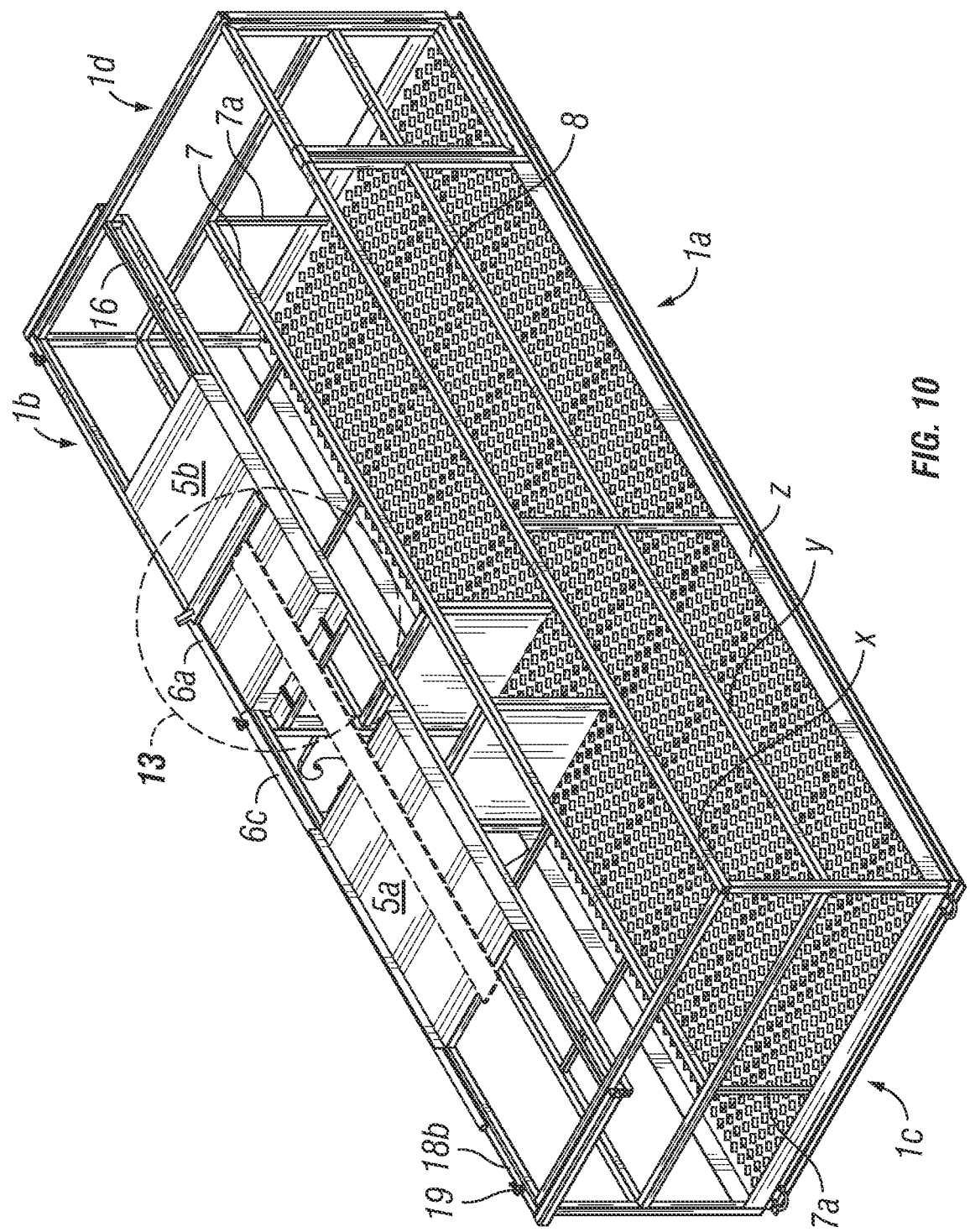
FIG. 10 is a top perspective view of the present invention shown with the telescoping arms in a retracted position and the material jig in a closed (or downwardly rotated) position.

FIG. 10 is a top perspective view of the present invention shown with the telescoping arms in a retracted position and the material jig in a closed (or downwardly rotated) position. This figure shows a piece of material lying across both of the work surfaces and abutting up against the material stop 6b of the material jig 6. When extended, the telescoping members 18 will support longer lengths of material, if necessary. In this manner, the longer-length material can be supported properly while the saw (not shown, but which would be resting on the saw platforms 3a, 3b and secured by the saw stops 3c) is in operation.

Figure 11:
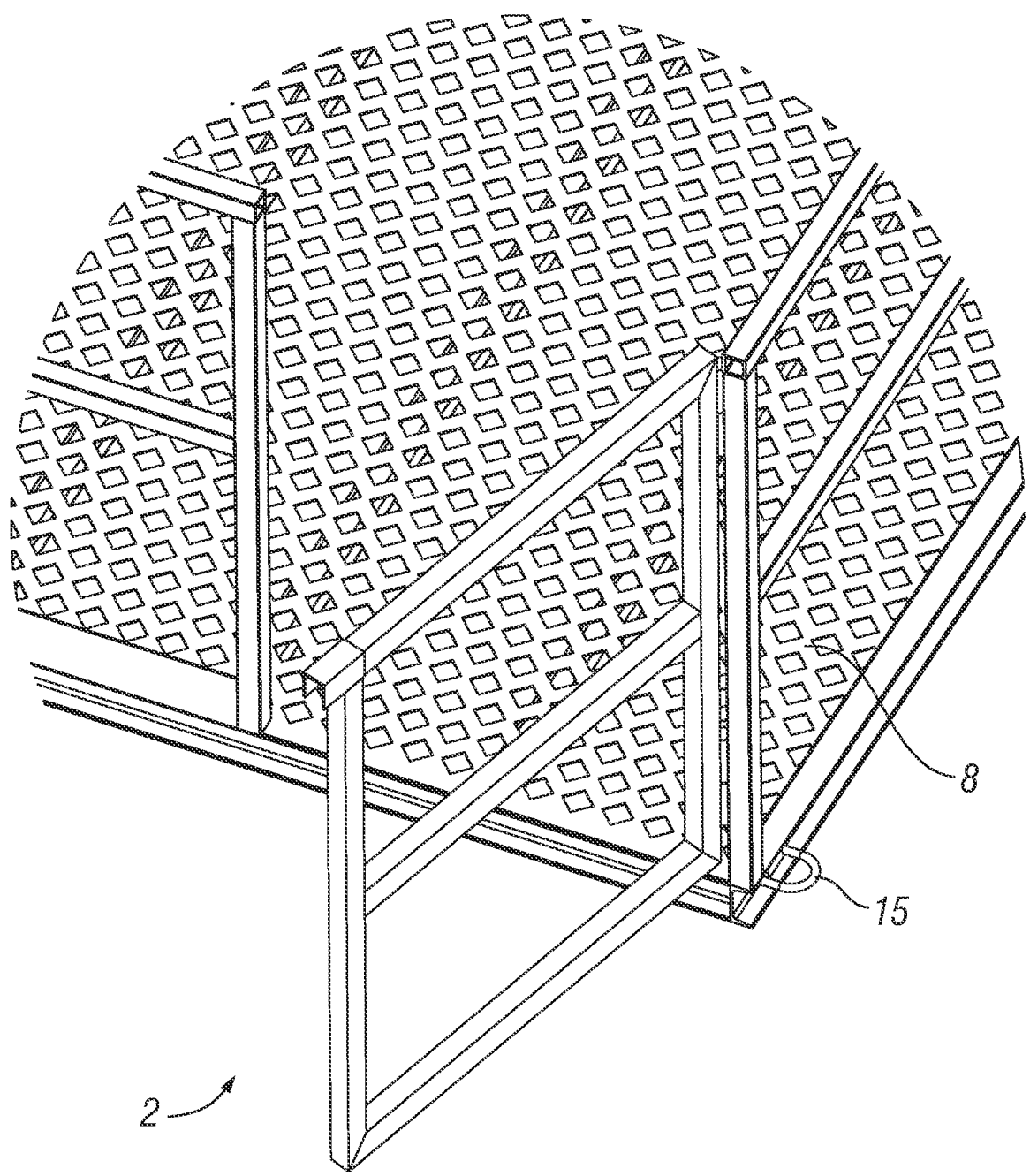
FIG. 11 is a detail view of the pivotable door of the present invention.

FIG. 11 is a detail view of the pivotable door of the present invention. As shown in this figure, the pivotable door 2 is preferably situated at the far right-hand corner of the front wall 1a and pivots outwardly.

Figure 12:
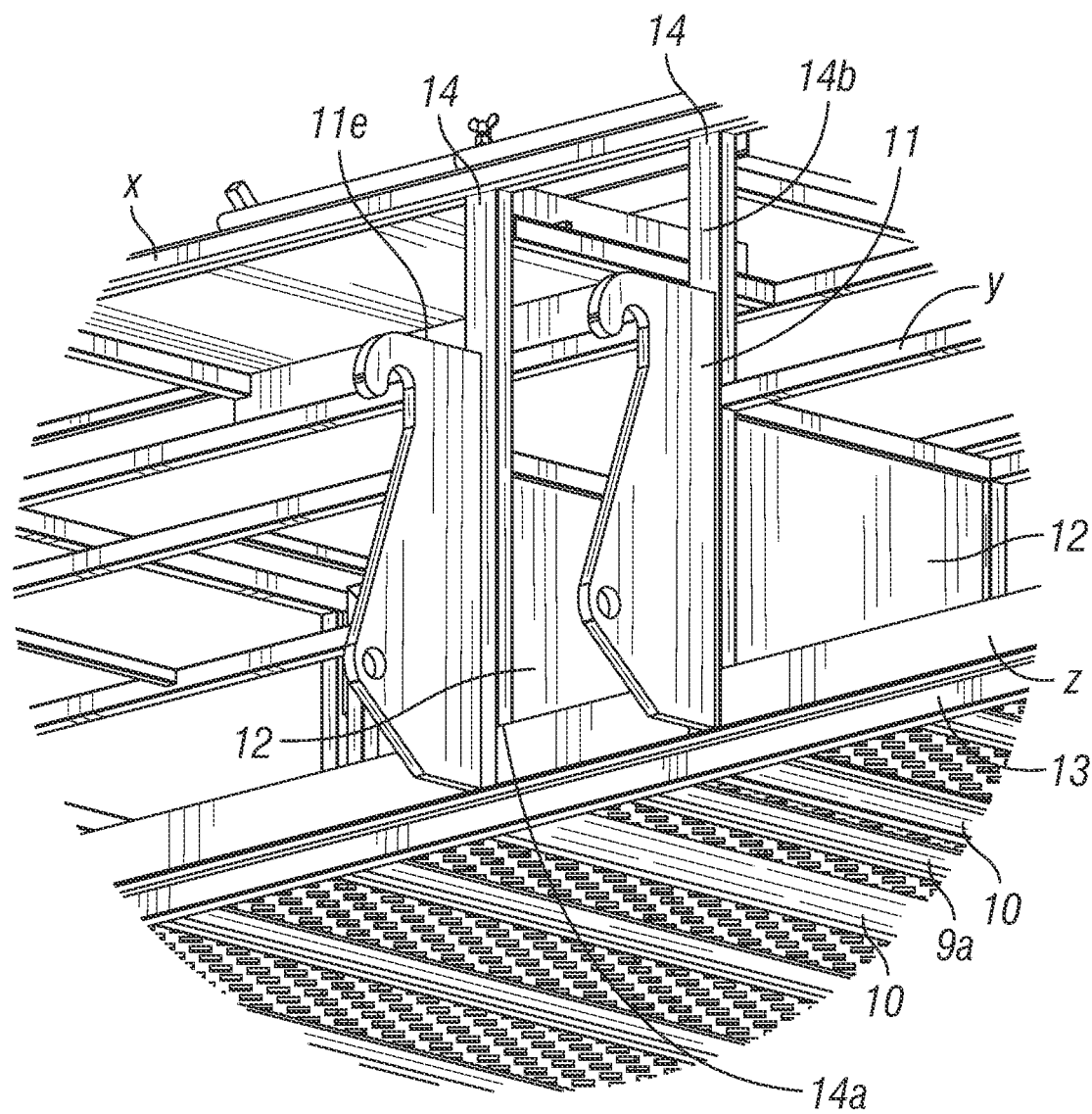
FIG. 12 is a detail view of the adapter plates or the present invention.

FIG. 12 is a detail view of the adapter plates of the present invention. As shown in this figure, the bottom ends 14a of the adapter plates 11 are attached to the bottom rail z of the rear wall 1b. Each adapter plate 11 is attached to the flat rear edge 14b of the mounting bracket 14 and situated so that it is perpendicular to the rear wall 1b. The top ends 11e of the adapter plates are situated on the mounting brackets 14 above the middle rail y but below the top rail x of the rear wall b. Each adapter plate 11 is preferably a flat piece of metal (see also FIG. 4, which shows the adapter plates 11 from a rear view).

FIG. 12 also shows the support channel 13 that underlies the bottom rail z of the rear wall 1b and that forms the underside of the perimeter of the frame 1. The support channels 10 that undergird the floor directly underneath the two support walls 12, as well as the support channels 13 that underlie the bottom rails z of the front, rear, and side walls 1a, 1b, 1c, 1d are preferably steel U-channels.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A man basket comprising:
   (a) a frame that is configured to form a front wall, a rear wall, and two side walls, wherein each of the front wall, the rear wall, and the two side walls is comprised of a top rail, a center rail, and a bottom rail;
   (b) first and second saw platforms extending inwardly from a center pan of the rear wall proximate to the top rail of the rear wall;
   (c) a first work surface that abuts up against an outer edge of the first saw platform and a second work surface that abuts up against an outer edge of the second saw platform;
   (d) a material jig that is comprised of:
      a telescoping arm that is positioned to a rear of the first and second saw platforms along the center part of the top rail of the rear wall; and
      a material stop that is perpendicular to the telescoping arm and configured to secure materials that are laid across the first and second work surfaces;
   (e) a floor that extends across an entire bottom surface of the man basket and is connected to the bottom rails of the front wall, the rear wall, and the first and second side wall, wherein the floor is undergirded by a plurality of support beams;
   (f) first and second mounting brackets, each of which extends from the top rail of the rear wall to the bottom rail of the rear wall;
   (g) a first adapter plate that is connected perpendicularly to the first mounting bracket and a second adapter plate that is connected perpendicularly to the second mounting bracket, each of the first and second adapter plates being configured to couple with a mounting bracket on a telehandler;
   (h) a first support wall that is connected perpendicularly to an inside surface of the first mounting bracket and a second support wall that is connected perpendicularly to an inside surface of the second mounting bracket, the first and second support walls being spaced apart from and parallel to one another; and
   (i) first and second telescoping members, the first telescoping member extending telescopically from a first end of the top rail of the rear wall, and the second telescoping member extending telescopically from a second end of the top rail of the rear wall;
      wherein each of the first and second telescoping members comprises:
         a longitudinal arm that is configured to slide into and out of tubing that is situated behind the first and second saw platforms; and
         a lateral arm that is perpendicular to the longitudinal arm.

2. The man basket of claim 1, wherein the top rail, the center rail, and the bottom rail of each of the front wall, the rear wall, and the two side walls are configured so that the top rail is higher than and parallel to the center rail, and the center rail is higher than and parallel to the bottom rail.

3. The man basket of claim 1, wherein the top rail of the front wall, the top rail of the rear wall, and the top rails of the two side walls are connected to each other to form a continuous upper perimeter of the frame.

4. The man basket of claim 1, wherein the center rail of the front wall, die center rail of the rear wall, and the center rails of the two side walls are connected to each other to form a continuous middle perimeter of the frame.

5. The man basket of claim 1, wherein the front wall comprises a pivotable door; and
   wherein, except for an area occupied by the pivotable door, the bottom rail of the front wall, the bottom rail of the rear wall, and the bottom rails of the two side walls are connected to each other to form a continuous lower perimeter of the frame.

6. The man basket of claim 1, wherein the first and second saw platforms each extends forwardly from one of the two mounting brackets on the rear wall of the frame.

7. The man basket of claim 1, wherein each of the two side walls has a depth; and
   wherein each of the first and second work surfaces extends forwardly from the center part of the rear wall for a distance that is less than half the depth of each of the two side walls.

8. The man basket of claim 1, wherein each of the first and second saw platforms comprises a pair of saw stops that are configured to prevent a saw from sliding on the saw platform.

9. The man basket of claim 6, wherein each of the saw platforms has a first end that is offset downwardly from a center part of the top rail of the rear wall and a second end that terminates at and is supported by a first support rail that extends longitudinally from the first side wall to the second side wall; and wherein the first support rail has a first end and a second end, the first end of the first support rail is situated proximate to and beneath the top rail of the first side wall, and the second end of the first support rail is situated proximate to and beneath the top rail of the second side wall.

10. The man basket of claim 9, wherein each of the first and second work surfaces is flush with the top rail of the rear wall and configured so that the first and second saw platforms are lower than the first and second work surfaces; and
wherein each of the first and second work surfaces is connected to the top rail of the rear wall along a back side of the work surface and connected to the first support rail along a front side of the work surface.

11. The man basket of claim 10, wherein the first work surface comprises a backstop that is situated along a back side of the work surface and extends upwardly from the back side of the work surface.

12. The man basket of claim 9, further comprising a second support rail that is situated directly underneath the first support rail and extends from the center rail of the first side wall to the center rail of the second side wall; and
a first support member that extends downwardly from a first end of the second support rail to the bottom rail of the first side wall and a second support member that extends downwardly from a second end of the second support rail to the bottom rail of the second support wall.

13. The man basket of claim 1, wherein the floor is comprised of a metal mesh material.

14. The man basket of claim 1, wherein each of the support beams that undergirds the floor extends from a front of the floor to a back of the floor.

15. The man basket of claim 1, wherein each of the support beams that undergirds the floor is comprised of hollow metal tubing.

16. The man basket of claim 1, further comprising two support channels, each of which is situated directly underneath the floor and aligned with the first and second support walls and with the first and second mounting brackets.

17. The man basket of claim 5, further comprising a support channel that is situated directly beneath the continuous lower perimeter of the frame.

18. The man basket of claim 1, wherein each of the first and second adapter plates is a single piece of metal with a straight back, a front belly portion with an opening that is configured to receive a locking pin, and an angled edge that extends upwardly and inwardly from the belly portion to a hook at a top of the adapter plate.

19. The man basket of claim 1, wherein the first mounting bracket is aligned front-to-back with a center of the first saw platform, and the second mounting bracket is aligned front-to-back with a center of the second saw platform.

20. The man basket of claim 1, wherein the first work surface extends left-to-right from the outer edge of the first saw platform to a point that is midway between the outer edge of the first saw platform and the first side wall, and the second work surface extends right-to-left from the outer edge of the second saw platform to a point that is midway between the outer edge of the second saw platform and the second side wall.

21. The man basket of claim 9, further comprising a first auxiliary rail that is positioned directly above the first support rail and extends from the outer edge of the first saw platform to the first side wall and a second auxiliary rail that is positioned directly above the first support rail and extends from the outer edge of the second saw platform to the second side wall;
wherein the first auxiliary rail is configured to support a front end of the first work surface, and the second auxiliary rail is configured to support a front end of the second work surface.

22. The man basket of claim 16, wherein the two support channels are steel U-channels.

23. The man basket of claim 17, wherein the support channel is a steel U-shaped channel.

24. The man basket of claim 1, wherein the lateral arm of the first telescoping member extends forwardly from a distal end of the longitudinal arm of the first telescoping member for a distance that is equal to a distance between the top rail of the rear wall and the first auxiliary rail; and
wherein the lateral arm of the second telescoping member extends forwardly from a distal end of the longitudinal arm of the second telescoping member for a distance that is equal to a distance between the top rail of the rear wall and the second auxiliary rail.

* * * * *